US011156120B2

(12) United States Patent
Osborne et al.

(10) Patent No.: US 11,156,120 B2
(45) Date of Patent: Oct. 26, 2021

(54) LINK SETTING ASSEMBLY AND METHOD

(71) Applicant: UNITED TECHNOLOGIES CORPORATION, Farmington, CT (US)

(72) Inventors: Christopher R. Osborne, East Haddam, CT (US); Nicholas G. Morganti, Durham, CT (US); Bernard W. Pudvah, Portland, CT (US); Anthony Valenti, Wolcott, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1425 days.

(21) Appl. No.: 15/075,386

(22) Filed: Mar. 21, 2016

(65) Prior Publication Data

US 2017/0268375 A1 Sep. 21, 2017

(51) Int. Cl.
| | |
|---|---|
| *F01D 25/28* | (2006.01) |
| *F01D 17/16* | (2006.01) |
| *F02C 3/04* | (2006.01) |
| *F01D 9/02* | (2006.01) |
| *F04D 29/56* | (2006.01) |

(52) U.S. Cl.
CPC ............ *F01D 17/162* (2013.01); *F01D 9/02* (2013.01); *F01D 25/285* (2013.01); *F02C 3/04* (2013.01); *F04D 29/563* (2013.01); *F05D 2220/32* (2013.01); *F05D 2260/50* (2013.01); *F05D 2260/79* (2013.01)

(58) Field of Classification Search
CPC ........ F01D 17/162; F01D 25/285; F01D 9/02; F04D 29/563; F02C 3/04; F05D 2260/50; F05D 2220/32; F05D 2260/79
See application file for complete search history.

(56) References Cited

U.S. PATENT DOCUMENTS

| | | | |
|---|---|---|---|
| 4,295,784 A | 10/1981 | Manning | |
| 4,403,912 A | 9/1983 | Pekari et al. | |
| 4,755,104 A | 7/1988 | Castro et al. | |
| 5,549,448 A | 8/1996 | Langston | |
| 6,457,937 B1* | 10/2002 | Mashey | ............... F01D 17/162 415/150 |
| 6,769,868 B2 | 8/2004 | Harrold | |
| 2013/0149023 A1 | 6/2013 | Wiecko et al. | |
| 2014/0010637 A1* | 1/2014 | Pudvah | ................. F01D 17/162 415/130 |

FOREIGN PATENT DOCUMENTS

| | | |
|---|---|---|
| EP | 1101902 A2 | 5/2001 |
| EP | 1387041 A2 | 2/2004 |
| GB | 2470586 A | 12/2010 |
| WO | 2015093243 A1 | 6/2015 |

OTHER PUBLICATIONS

European Search Report for European Patent Application No. 17161371.4, completed Aug. 2, 2017.

* cited by examiner

*Primary Examiner* — Rick K Chang (74) *Attorney, Agent, or Firm* — Carlson, Gaskey & Olds, P.C.

(57) ABSTRACT

A link setting assembly according to an exemplary aspect of the present disclosure includes, among other things, a fixture including at least one platform mount and at least one linkage mount. The at least one linkage mount is spaced-apart from the platform mount by a distance corresponding to a predetermined link length.

13 Claims, 5 Drawing Sheets

FIG.5

LINK SETTING ASSEMBLY AND METHOD

BACKGROUND

This disclosure relates to a gas turbine engine, and more particularly to a link setting assembly and associated method.

Gas turbine engines typically include a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Some areas of the gas turbine engine may include variable vanes. The compressor, for example, may include multiple stages of variable vanes. In some compressor designs, the variable vanes are connected to a synchronizing ring (sync-ring) by vane arms. The vanes are driven by the sync-rings, which rotate clockwise and counterclockwise around the compressor case to pivot the vane arms and set the vane angle that optimizes engine operability (e.g., preventing stalling and/or buffeting) and engine performance (e.g., maximizing thrust and/or minimizing fuel consumption). During operation, an actuation system drives the sync-rings.

In one example, the actuation system is operably connected to a plurality of sync-rings by way of a torque box assembly. In particular, the torque box assembly includes a plurality of links connected to the sync-rings. The links have an adjustable length and angular position. The lengths and angles of the links are typically set as the torque box assembly is mounted to the gas turbine engine.

SUMMARY

A link setting assembly according to an exemplary aspect of the present disclosure includes, among other things, a fixture including at least one platform mount and at least one linkage mount. The at least one linkage mount is spaced-apart from the platform mount by a distance corresponding to a predetermined link length.

In a further non-limiting embodiment of the foregoing link setting assembly, the assembly includes a first linkage mount and a second linkage mount. The first linkage mount is spaced-apart from the at least one platform mount by a first distance corresponding to a first predetermined link length, and the second linkage mount is spaced-apart from the at least one platform mount by a second distance different than the first distance and corresponding to a second predetermined link length.

In a further non-limiting embodiment of either of the foregoing link setting assemblies, a third linkage mount is spaced-apart from the at least one platform mount by a third distance corresponding to a third predetermined link length. The third distance is different than the first and second distances.

In a further non-limiting embodiment of any of the foregoing link setting assemblies, a fourth linkage mount is spaced-apart from the at least one platform mount by a fourth distance corresponding to a fourth predetermined link length. The fourth distance is different than the first, second, and third distances.

In a further non-limiting embodiment of either of the foregoing link setting assemblies, the first, second, third, and fourth distances include a lateral dimension and a height dimension.

In a further non-limiting embodiment of either of the foregoing link setting assemblies, the at least one platform mount and the first, second, third, and fourth linkage mounts are provided on a common fixture plate.

In a further non-limiting embodiment of either of the foregoing link setting assemblies, each of the first and second linkage mounts includes a link receiver configured to connect to an end of a respective link, each of the link receivers having a link receiver axis.

In a further non-limiting embodiment of either of the foregoing link setting assemblies, the link receiver axis of at least one of the first and second linkage mounts is inclined at non-zero angle relative to an upper surface of a fixture plate.

In a further non-limiting embodiment of either of the foregoing link setting assemblies, the link receiver axis of at least one of the first and second linkage mounts is parallel to an upper surface of a fixture plate.

In a further non-limiting embodiment of either of the foregoing link setting assemblies, the link receiver axes of the first and second linkage mounts are spaced-apart from an upper surface of a fixture plate at different heights.

In a further non-limiting embodiment of either of the foregoing link setting assemblies, the at least one platform mount includes a first platform mount configured to connect to axial mounts of a torque box assembly and a second platform mount configured to connect to radial mounts of a torque box assembly.

In a further non-limiting embodiment of either of the foregoing link setting assemblies, the assembly further includes a substitute actuator configured to connect to a torque box assembly and lock the torque box assembly in a predetermined position.

In a further non-limiting embodiment of either of the foregoing link setting assemblies, the assembly further includes at least one angle setting block configured to set a predetermined angular link position.

A method according to another exemplary aspect of the present disclosure includes, among other things, mounting a torque box assembly to a fixture, adjusting a length of a link of the torque box assembly, and connecting the link to a linkage mount of the fixture.

In a further non-limiting embodiment of the foregoing method, the method includes adjusting an angular position of the link.

In a further non-limiting embodiment of either of the foregoing methods, an angle setting block is used to adjust the angular position of the link.

In a further non-limiting embodiment of any of the foregoing methods, the method further includes adjusting the length and angular positions of a plurality of links of the torque box assembly, and connecting each of the plurality of links to a respective linkage mount of the fixture.

In a further non-limiting embodiment of any of the foregoing methods, the length of each of the plurality of links is different.

In a further non-limiting embodiment of any of the foregoing methods, an angular position of one of the plurality of links is inclined at an acute angle relative to an upper surface of a fixture plate.

In a further non-limiting embodiment of any of the foregoing methods, the method further includes mounting a substitute actuator to the torque box assembly to lock the torque box assembly in a predetermined position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
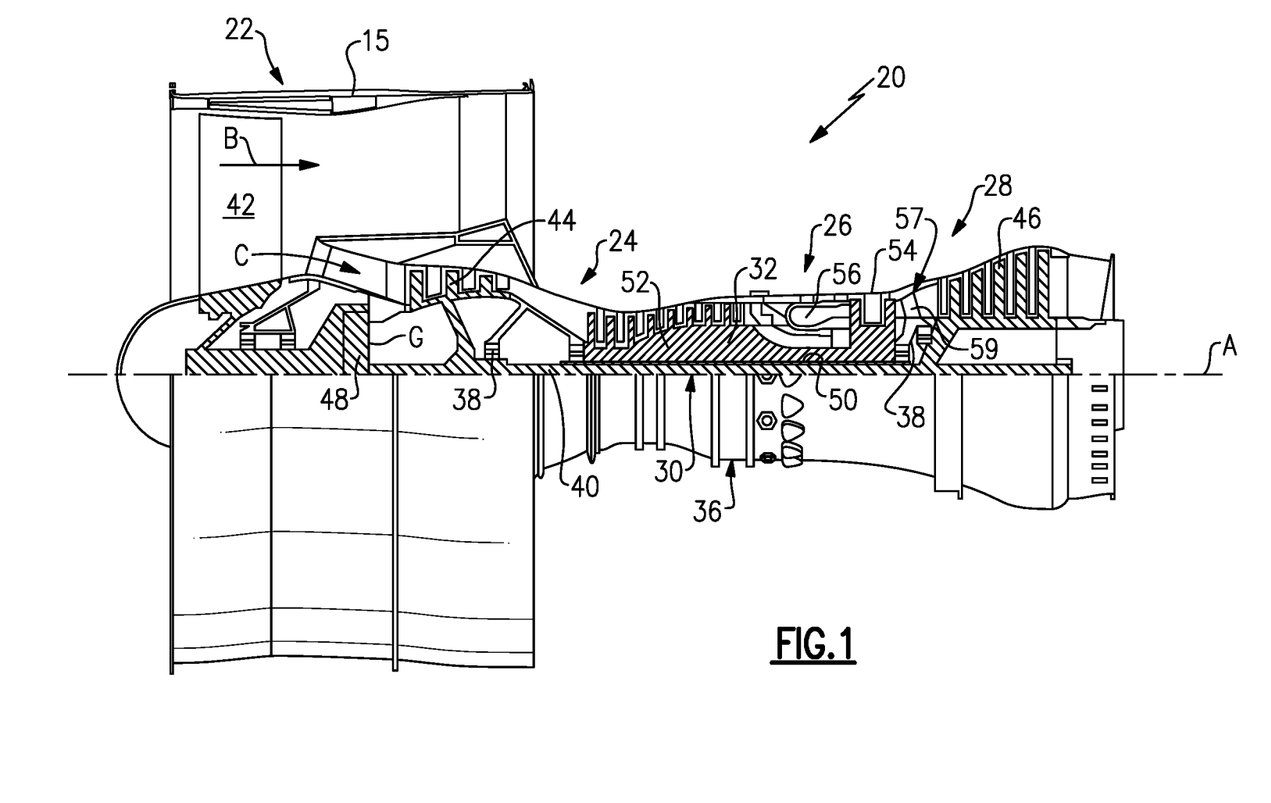
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The geared architecture 48 in this example includes a gearbox G, which is a housing, and encloses one or more gears, such as a sun gear and one or more planetary gears. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 feet/second (350.5 meters/second).

Figure 2:
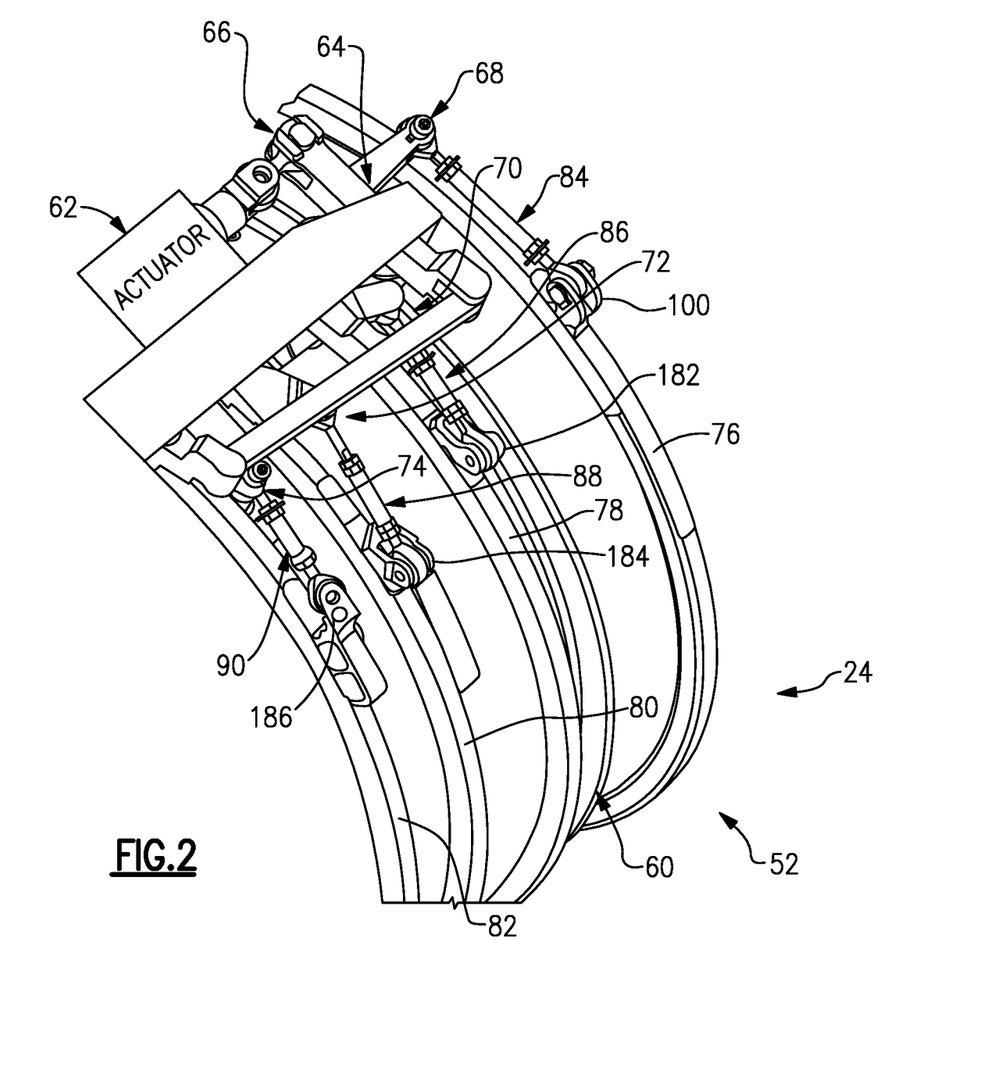
FIG. 2 illustrates a partial view an example section of the gas turbine engine including an example torque box assembly.

FIG. 2 illustrates a partial view of a section of the gas turbine engine 20. In this example, the section is the high pressure compressor 52. In particular, FIG. 2 illustrates a portion of a high pressure compressor case 60, which supports a high pressure compressor actuator 62 and a torque box assembly 64. While a particular gas turbine engine 20 is shown and described relative to FIG. 1, it should be understood that this disclosure extends to other types of gas turbine engines. Additionally, while the high pressure compressor 52 is shown in FIG. 2, this disclosure extends to other sections of the engine.

The torque box assembly 64 is connected to the high pressure compressor actuator 62 by way of an input bell crank 66. The torque box assembly 64 transfers the force from the high pressure compressor actuator 62 to a plurality of output bell cranks 68, 70, 72, 74. The output bell cranks 68, 70, 72, 74 are connected to first, second, third, and fourth sync-rings 76, 78, 80, 82 by way of first, second, third, and fourth links 84, 86, 88, 90, respectively. While not illustrated, each of the sync-rings 76, 78, 80, 82 is connected to a plurality of stator vanes, which have an adjustable angular position. The angular position of the stator vanes is adjustable in response to adjustments of the position of the sync-rings 76, 78, 80, 82, which are ultimately responsive to adjustments of the high pressure compressor actuator 62. In this example, the torque box assembly 64 is connected to four sync-rings by way of four links. This disclosure extends to other examples where there are a different number of sync-rings and links.

In order to ensure that the movements of the high pressure compressor actuator 62 correspond to the desired vane position, the connection between the torque box assembly 64 and the sync-rings 76, 78, 80, 82 must be precisely set. In this disclosure, the lengths and angular positions of the links 84, 86, 88, 90 are adjustable and are set to ensure an appropriate connection. The desired lengths and angular positions of the links 84, 86, 88, 90 are predetermined, and correspond to the dimensions of the subject gas turbine engine 20, high pressure compressor actuator 62, and torque box assembly 64.

Figure 3:
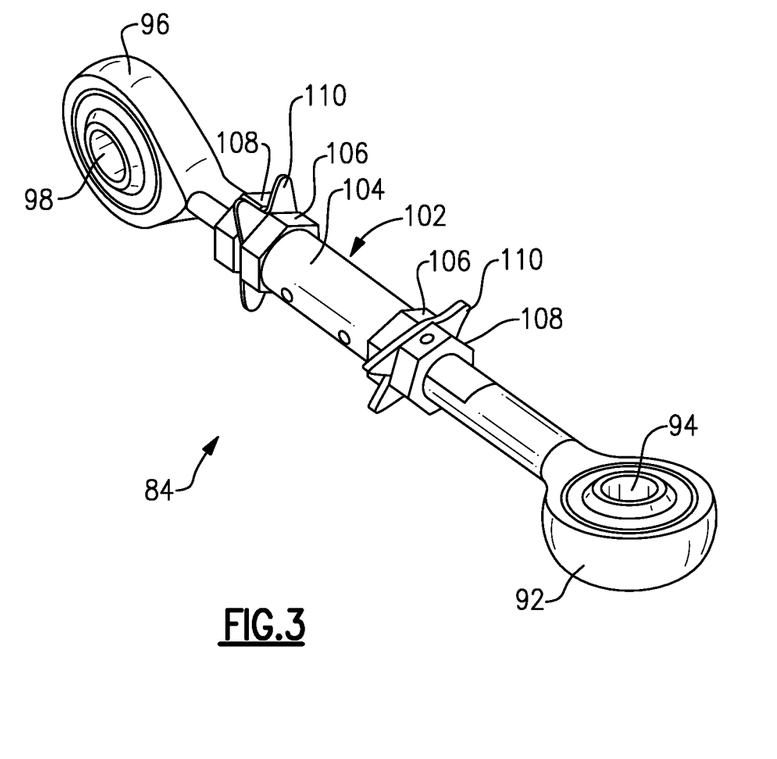
FIG. 3 illustrates an example link.

FIG. 3 illustrates the detail of the first link 84. While FIG. 3 illustrates only the first link 84, it should be understood that the remaining links 86, 88, 90 are similarly arranged. In this example, the first link 84 includes a first tie-rod tongue 92 having an aperture 94 for connection to the output bell crank 68. The first link 84 further includes a second tie-rod tongue 96 opposite the first tie-rod tongue 92. The second tie-rod tongue 96 has an aperture 98 for connection to a clevis 100 of the sync-ring 76 (See FIG. 2). In this disclosure, reference to a length of the links refers to the relative spacing of the tie-rod tongues 92, 96, for example, and reference to the angular position of the links refers to the relative angles of the tie-rod tongues 92, 96. For example, in FIG. 3, the tie-rod tongues 92, 96 are arranged substantially perpendicular to one another.

Between the first and second tie-rod tongues 92, 96, the first link 84 includes a tie rod 102. The length of the tie rod 102 is adjustable, and adjusts the relative spacing of the first and second tie-rod tongues 92, 96. In this example, the tie rod 102 includes a turnbuckle 104 and opposing pairs of jam nuts 106, 108 on each end of the turnbuckle 104. Further, a tab washer 110 is provided between each pair of jam nuts 106, 108. When the jam nuts 106, 108 are loosened, both the length and angular position of the first link 84 can be adjusted. Once set, the length and angular position of the first link 84 is locked by tightening the jam nuts 106, 108 and bending the ears of the tab washers 110. This disclosure extends to other types of links that have selectively adjustable lengths and angular positions, and is not limited to the details of FIG. 3.

Figure 4:
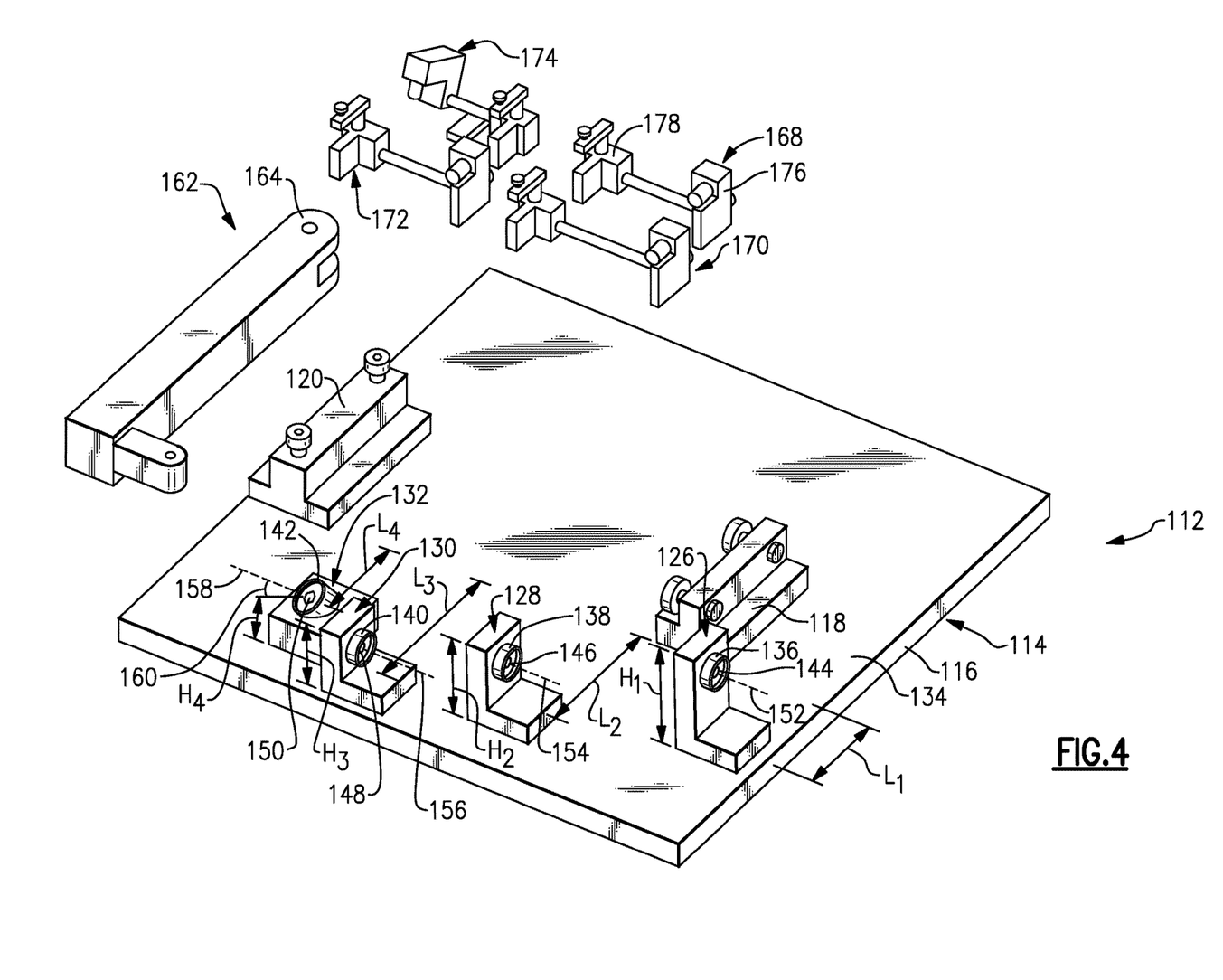
FIG. 4 illustrates an example link setting assembly.

As generally discussed above, the length and angular position of the links 84, 86, 88, 90 need to be set to correspond to particular, predetermined link dimensions, which allows the desired sync-ring and vane movement. FIG. 4 illustrates one example link setting assembly 112 according to this disclosure. The link setting assembly 112 is used to set the length and angular position of the links 84, 86, 88, 90 before mounting the torque box assembly 64 to the engine 20.

In this disclosure, the link setting assembly 112 includes a fixture 114 having a fixture plate 116. In this example, there is at least one platform mount and at least one linkage mount mounted to the fixture plate 116. The platform mounts are configured to connect to the torque box assembly 64, and the linkage mounts are configured to connect to the links 84, 86, 88, 90.

In this example, there are two platform mounts 118, 120. The first platform mount 118 is configured to connect to an axial engine attachment 122 (see FIG. 5) of the torque box assembly 64, and the second platform mount 120 is configured to attach to a radial engine attachment 124 (see FIG. 5) of the torque box assembly 64.

The link setting assembly 112 further includes at least one linkage mount spaced apart from the platform mounts 118, 120 by a distance corresponding to the predetermined length of a corresponding link. In this example, the torque box assembly 64 includes four links, and thus there are four linkage mounts 126, 128, 130, 132. While four linkage mounts are illustrated, this disclosure extends to examples where there are a different number of links and linkage mounts.

In this example, each of the linkage mounts 126, 128, 130, 132 includes a link receiver 136, 138, 140, 142 configured to connect to a tie-rod tongue, such as the tie-rod tongue 96, of a respective link. Each of the link receivers 136, 138, 140, 142 includes a respective aperture 144, 146, 148, 150 arranged about a respective link receiver axis 152, 154, 156, 158. In this example, the axes 152, 154, 156, of the first, second, and third link receivers 136, 138, 140 are arranged substantially parallel to an upper surface 134 of the plate 116. The fourth axis 158 is inclined at an acute angle 160 relative to the upper surface 134. In this example, the acute angle 160 is within a range of about 18 to 24 degrees. In a further example, the angle 160 is about 21 degrees. This disclosure is not limited to the particular angles of the link receiver axes 152, 154, 156, 158 and extends to other arrangements.

In this example, each linkage mount 126, 128, 130, 132 is arranged at a different distance relative to the platform mounts 118, 120. The distances include a lateral dimension and a height dimension. In this example, the first link receiver axis 152 is spaced a lateral distance $L_1$ from a side face of the first platform mount 118, and a height $H_1$ above the upper surface 134 of the plate 116. The first platform mount 118 and the upper surface 134 are used as reference points for purposes of explanation only, and should not otherwise be considered limiting.

With continued reference to FIG. 4, the second link receiver axis 154 is provided at a lateral distance $L_2$ from the mount 118 and a height $H_2$ above the upper surface 134. Likewise, the third link receiver axis 156 is a lateral distance $L_3$ from the first mount 118 and a height $H_3$ above the upper surface 134. The outermost portion of the aperture 150 of the fourth link receiver 142 is a height $H_4$ above the upper surface 134 and is spaced laterally from the first mount 118 by a lateral distance $L_4$. In this example, the lateral distances $L_1, L_2, L_3, L_4$ are all different from one another. Further, the heights $H_1, H_2, H_3$, and $H_4$ are all different one another. The lateral distances $L_1, L_2, L_3, L_4$ and heights $H_1, H_2, H_3$, and $H_4$ correspond to the predetermined lengths and angular positions of the links 84, 86, 88, 90, respectively. This disclosure is not limited to any particular link lengths, and extends to links that have the same length, as well as links that have different lengths.

In addition to the fixture 114, the link setting assembly 112 further includes a substitute actuator 162. The substitute actuator 162 includes a clevis 164 configured to connect to a bell crank link 166 (see FIG. 5) of the input bell crank 66. The substitute actuator 162 is configured to lock the torque box assembly 64 in a predetermined position. In one example, the predetermined position corresponds to a mid-stroke position of the high pressure compressor actuator 62.

The link setting assembly 112 further includes a plurality of angle setting blocks 168, 170, 172, 174. Each angle setting block has a first end 176 and a second end 178. The first and second ends 176, 178 are at a predetermined angle relative to one another. The first and second ends 176, 178 receive the first and second tie-rod tongues of a respective link and can be used to set, or check, the relative angle of the tie-rod tongues.

Figure 5:
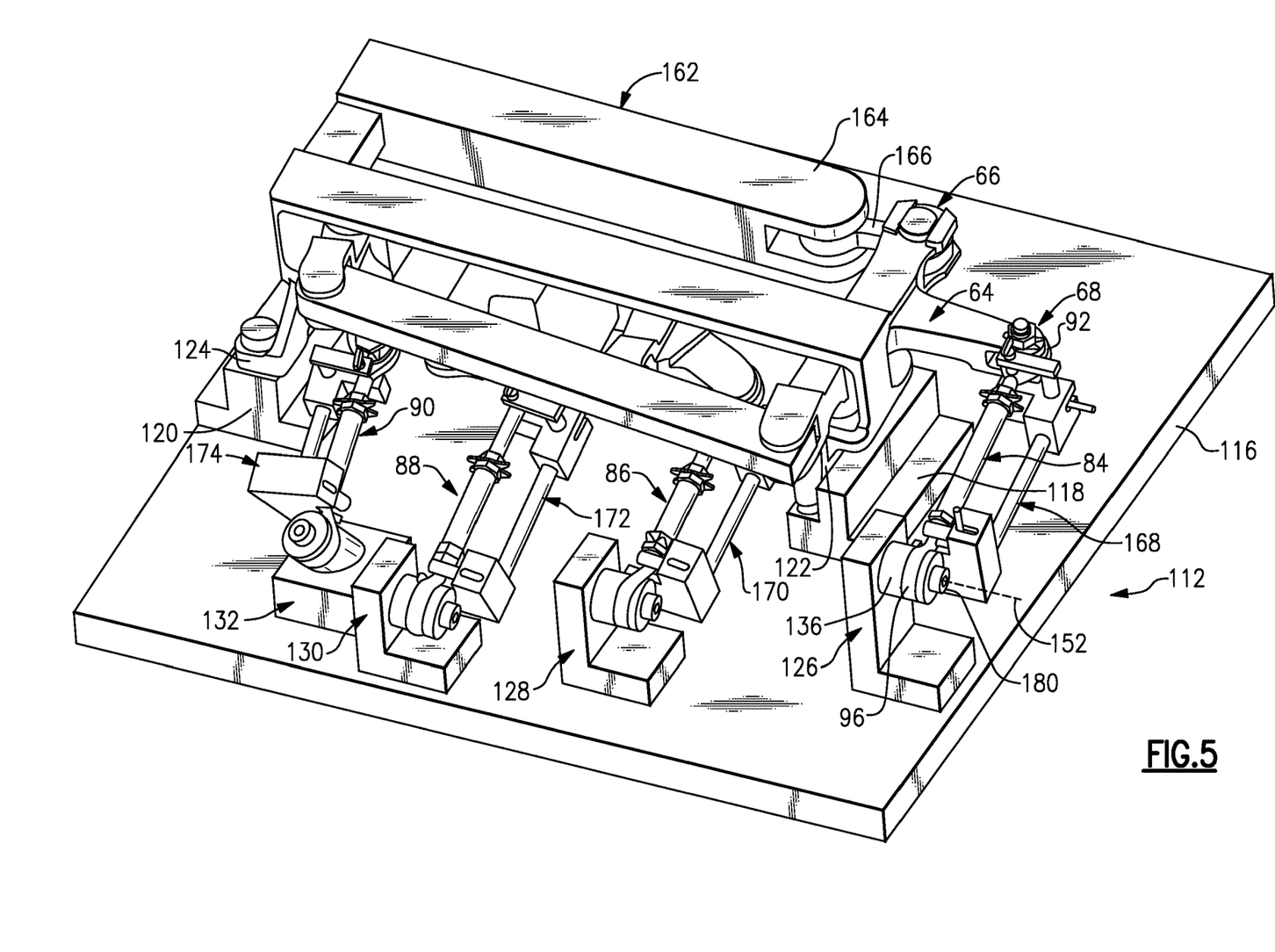
FIG. 5 illustrates the example torque box assembly mounted to the example link setting assembly.

FIG. 5 is a view of the torque box assembly 64 mounted to the link setting assembly 112. As illustrated, the axial engine attachment 122 of the torque box assembly 64 is connected to the first platform 118, and the radial engine attachment 124 of the torque box assembly 64 is connected to the second platform mount 120. Further, each of the first, second, third, and fourth links 84, 86, 88, 90 are connected to a respective one of the first, second, third, and fourth linkage mounts 126, 128, 130, and 132, and in particular are connected directly to the link receivers 136, 138, 140, 142.

With reference to the first link 84, the first tie-rod tongue 92 is connected to the first output bell crank 68, and the second tie-rod tongue 96 is connected to the first link receiver 136. A first bolt assembly 180 extends through the aperture 98 and the aperture 144 along the axis 152. The remaining links 86, 88, and 90 are similarly connected to a respective linkage mount 128, 130, 132. With further reference to the first link 84, the first angle setting block 168 is used set the appropriate angle between the first and second tie-rod tongues 92, 96. Again, in this example, the first and second tie-rod tongues 92, 96 are oriented substantially perpendicular (i.e., 90°) relative to one another.

In one example method of use, the torque box assembly 64 is mounted to the first and second platform mounts 118, 120. Next, the substitute actuator 162 is connected to the torque box assembly 64 to lock the output bell cranks 68, 70, 72, 74 against movement. Once locked, the length and angular position of each link 84, 86, 88, 90 is adjusted until each link is connected to a corresponding one of the link receivers 136, 138, 140, 142. During adjustment, the jam nuts 106, 108 are loosened. While loosened, the links 84, 86, 88, 90 are connected to a respective link receiver 136, 138, 140, 142 by way of the bolt assembly, such as the bolt assembly 180, to set the link length. While still loosened, the angle setting blocks 168, 170, 172, 174 may be used to set, or check, the link angle. When the length and angle are set, the jam nuts 106, 108 and tab washers 110 are tightened so as to fix the length and angular position of each of the links.

The linkage mounts 126, 128, 130, 132 are set on the fixture plate 116 to correspond to the location of the devises 100, 182, 184, 186 associated with the respective sync-rings 76, 78, 80, 82. Thus, the link setting assembly 112 can be used to set the position of the links 84, 86, 88, 90 prior to mounting the torque box assembly 64 to the engine 20.

The link setting assembly 112 of this disclosure eliminates the need to set the length and angular position of the links individually as the torque box assembly 64 is mounted to the engine. By setting the links before mounting to the engine, this disclosure reduces assembly time and assembly errors.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A link setting assembly, comprising:
a fixture including at least one platform mount and at least one linkage mount, wherein the at least one linkage mount is spaced-apart from the platform mount by a distance corresponding to a predetermined link length, wherein the link setting assembly is configured to set one of a length and an angular position of a link before the link is mounted to a gas turbine engine.

2. The link setting assembly as recited in claim 1, further comprising:
a first linkage mount and a second linkage mount, wherein the first linkage mount is spaced-apart from the at least one platform mount by a first distance corresponding to a first predetermined link length, and wherein the second linkage mount is spaced-apart from the at least one platform mount by a second distance different than the first distance and corresponding to a second predetermined link length.

3. The link setting assembly as recited in claim 2, further comprising:
a third linkage mount spaced-apart from the at least one platform mount by a third distance corresponding to a third predetermined link length, wherein the third distance is different than the first and second distances.

4. The link setting assembly as recited in claim 3, further comprising:
a fourth linkage mount spaced-apart from the at least one platform mount by a fourth distance corresponding to a fourth predetermined link length, wherein the fourth distance is different than the first, second, and third distances.

5. The link setting assembly as recited in claim 4, wherein the first, second, third, and fourth distances include a lateral dimension and a height dimension.

6. The link setting assembly as recited in claim 4, wherein the at least one platform mount and the first, second, third, and fourth linkage mounts are provided on a common fixture plate.

7. The link setting assembly as recited in claim 2, wherein each of the first and second linkage mounts includes a link receiver configured to connect to an end of a respective link, each of the link receivers having a link receiver axis.

8. The link setting assembly as recited in claim 7, wherein the link receiver axis of at least one of the first and second linkage mounts is inclined at non-zero angle relative to an upper surface of a fixture plate.

9. The link setting assembly as recited in claim 7, wherein the link receiver axis of at least one of the first and second linkage mounts is parallel to an upper surface of a fixture plate.

10. The link setting assembly as recited in claim 7, wherein the link receiver axes of the first and second linkage mounts are spaced-apart from an upper surface of a fixture plate at different heights.

11. The link setting assembly as recited in claim 1, wherein the at least one platform mount includes a first platform mount configured to connect to axial mounts of a torque box assembly and a second platform mount configured to connect to radial mounts of a torque box assembly.

12. The link setting assembly as recited in claim 1, further comprising a substitute actuator configured to connect to a torque box assembly and lock the torque box assembly in a predetermined position.

13. The link setting assembly as recited in claim 1, further comprising at least one angle setting block configured to set a predetermined angular link position.

\* \* \* \* \*